(12) United States Patent
Jones et al.

(10) Patent No.: US 8,200,544 B1
(45) Date of Patent: Jun. 12, 2012

(54) METHOD AND SYSTEM FOR JUST-IN-TIME GIFT CARD ACTIVATION AND ASSIGNMENT

(75) Inventors: Stephen Jones, Escondido, CA (US); Basil Ablfaker, San Diego, CA (US)

(73) Assignee: Transaction Wireless, Inc., San Diego, CA (US)

( * ) Notice: Subject to any disclaimer, the term of this patent is extended or adjusted under 35 U.S.C. 154(b) by 2 days.

(21) Appl. No.: 13/105,865

(22) Filed: May 11, 2011

(51) Int. Cl.
 *G06Q 30/00* (2012.01)
(52) U.S. Cl. .......................................... 705/26.1; 705/30
(58) Field of Classification Search ................. 705/26.1, 705/14.1, 14.11, 14.17, 14.22, 30
See application file for complete search history.

(56) References Cited

U.S. PATENT DOCUMENTS

| | | | |
|---|---|---|---|
| 7,083,084 B2 | 8/2006 | Graves et al. | |
| 7,363,273 B2 | 4/2008 | Phillips et al. | |
| 7,537,152 B2 | 5/2009 | Chakiris et al. | |
| 2002/0198777 A1 | 12/2002 | Yuasa | |
| 2005/0051619 A1 | 3/2005 | Graves et al. | |
| 2009/0055296 A1 | 2/2009 | Nelsen | |
| 2009/0179074 A1 | 7/2009 | Hurst | |
| 2010/0041368 A1 | 2/2010 | Kumar | |
| 2010/0076833 A1 | 3/2010 | Nelsen | |
| 2010/0280921 A1 | 11/2010 | Stone et al. | |
| 2011/0131107 A1* | 6/2011 | Hurst | 705/26.1 |

* cited by examiner

*Primary Examiner* — Elaine Gort
(74) *Attorney, Agent, or Firm* — Clause Eight IPS; Michael Catania (57) ABSTRACT

A method and system for post-delivery assignment and activation of an electronic gift card is disclosed herein. The present invention is a process wherein card account numbers are only assigned to electronic gift cards when viewed or accessed by the end customer, and thus the present invention limits the requirement of assigning account numbers excessively in bulk and eliminating the waste of unused account numbers and unused plastic.

3 Claims, 11 Drawing Sheets

(Prior Art)

FIG. 10

(Prior Art)

FIG. 11

(Prior Art)

1

METHOD AND SYSTEM FOR JUST-IN-TIME GIFT CARD ACTIVATION AND ASSIGNMENT

CROSS REFERENCE TO RELATED APPLICATION

Not Applicable

STATEMENT REGARDING FEDERALLY SPONSORED RESEARCH OR DEVELOPMENT

Not Applicable

BACKGROUND OF THE INVENTION

1. Field of the Invention

The present invention generally relates to stored value accounts. More specifically, the present invention specifically relates to the business-to-business transactions involved in the distribution of electronic gift cards.

2. Description of the Related Art

In modern society, gift cards have become as ubiquitous as government currency. Financial institutions have facilitated the process for retailers, large and small, to offer some form of gift cards to consumers. The widespread use of gift cards has generated new business-to-business transactions that increase the efficiency of distributing gift cards from retailers to consumers. Gift cards are generally included under stored value accounts. In addition to gift cards, other stored value accounts include coupons, reward/loyalty values, stored value programs generated by entities such as GROUPON, and the like.

Traditional business-to-business gift card programs consist of an entity purchasing mass quantities of gift cards from a retailer/brand to receive a discount and then distributing them to end users. Examples can be of an employer purchasing cards for their employees or resellers purchasing cards to sell for a profit. In all scenarios allocating and assigning card account numbers to physical plastic is completed primarily on the gift card processor due to the nature of plastic/magnetic-strip cards.

Figure 9:
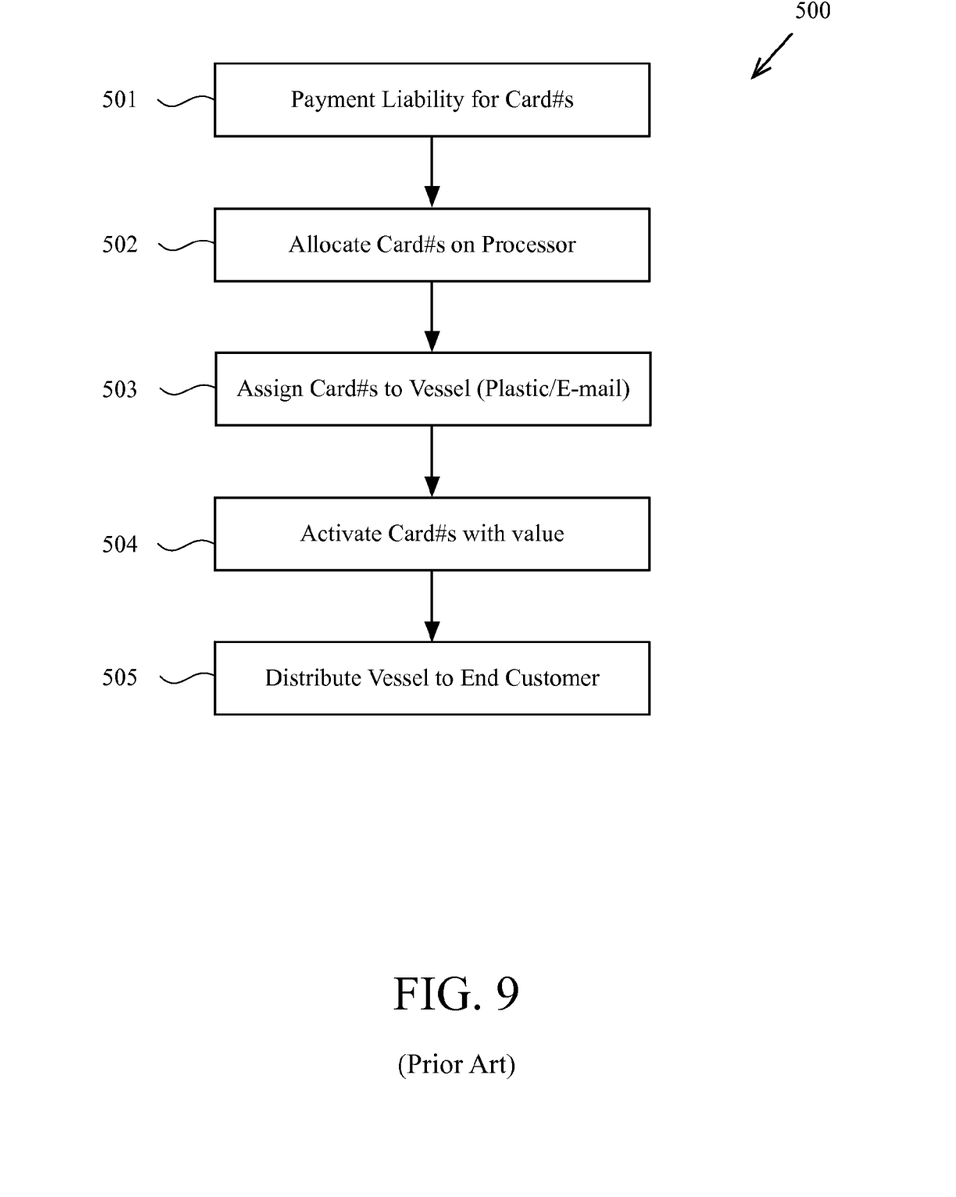
FIG. 9 is a flow chart of a method of the prior art.

Typically, as shown in FIG. 9, a pre-payment activation process 500 begins at block 501 with a purchasing stage where a distributor purchases gift cards from a retailer/brand entity (a particular brand of merchandise). Next, at block 502, during the inventory allocation stage, the retailer/brand entity allocates a Bank Identification Number ("BIN") range of account numbers to the distributor and at block 503 a processor assigns the account numbers to the plastic gift cards. Next, at block 504, during an activation stage, the retailer/brand activates the gift cards and provides the inventory of gift cards to the distributor. Alternatively, the distributor requests that the gift cards be activated on-demand by the retailer/brand entity or the retailer/brand entity's gift card processor. Finally, at block 505, the distributor distributes/sells the gift cards to the end users (i.e., customers).

Figure 10:
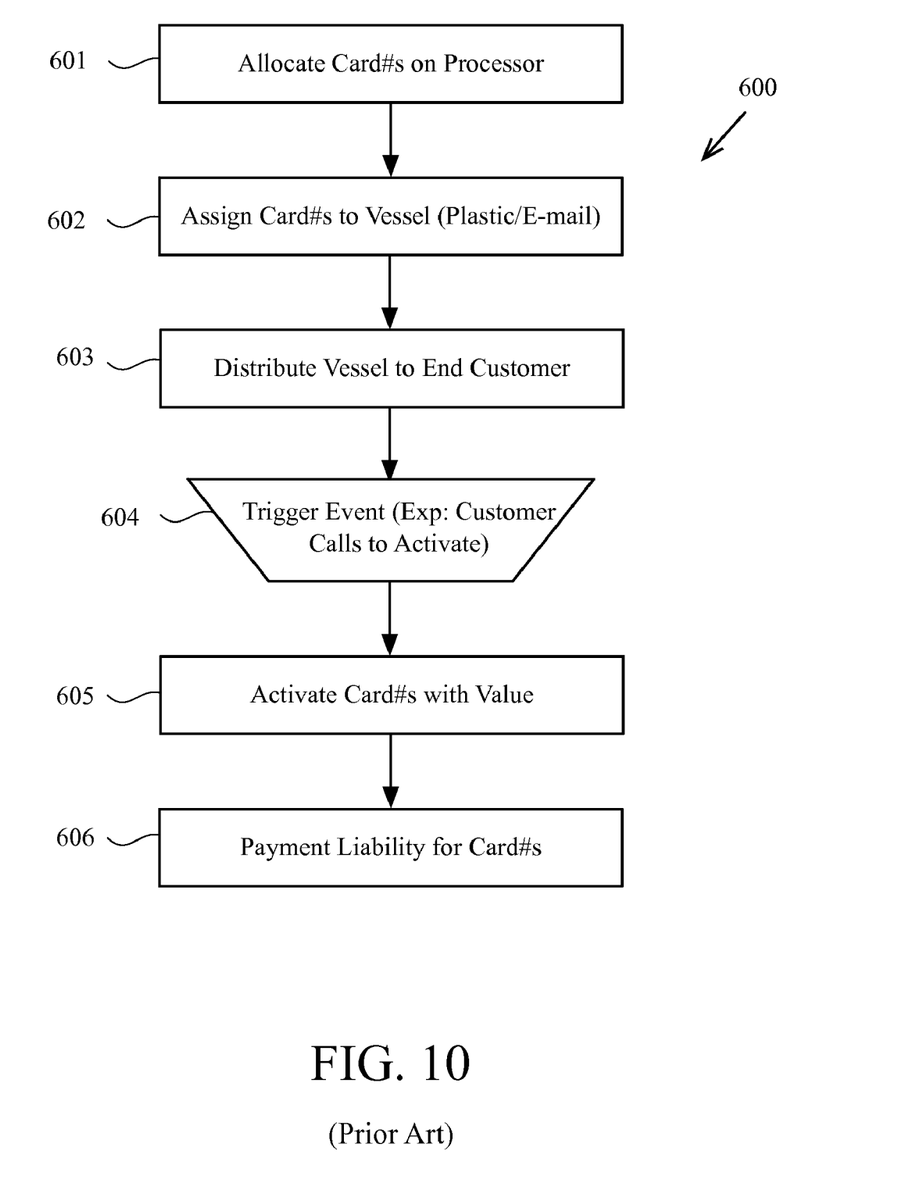
FIG. 10 is a flow chart of a method of the prior art.

Under a post-payment activation process, as shown in FIG. 10, the process 600 begins with the inventory allocation stage at block 601, where the retailer/brand entity allocates a BIN range of account numbers to the distributor and at block 602 a processor assigns the account numbers to the plastic gift cards. Next, at block 603 the distributor distributes/sells the gift cards to the end users which then triggers an event 604. Next, at block 605, during an activation stage, the distributor requests that the gift cards be activated on-demand by the retailer/brand entity or the retailer/brand entity's gift card processor. Finally, at block 606 during a purchase stage, the retailer/brand entity invoices the distributor for the activated cards.

Figure 11:
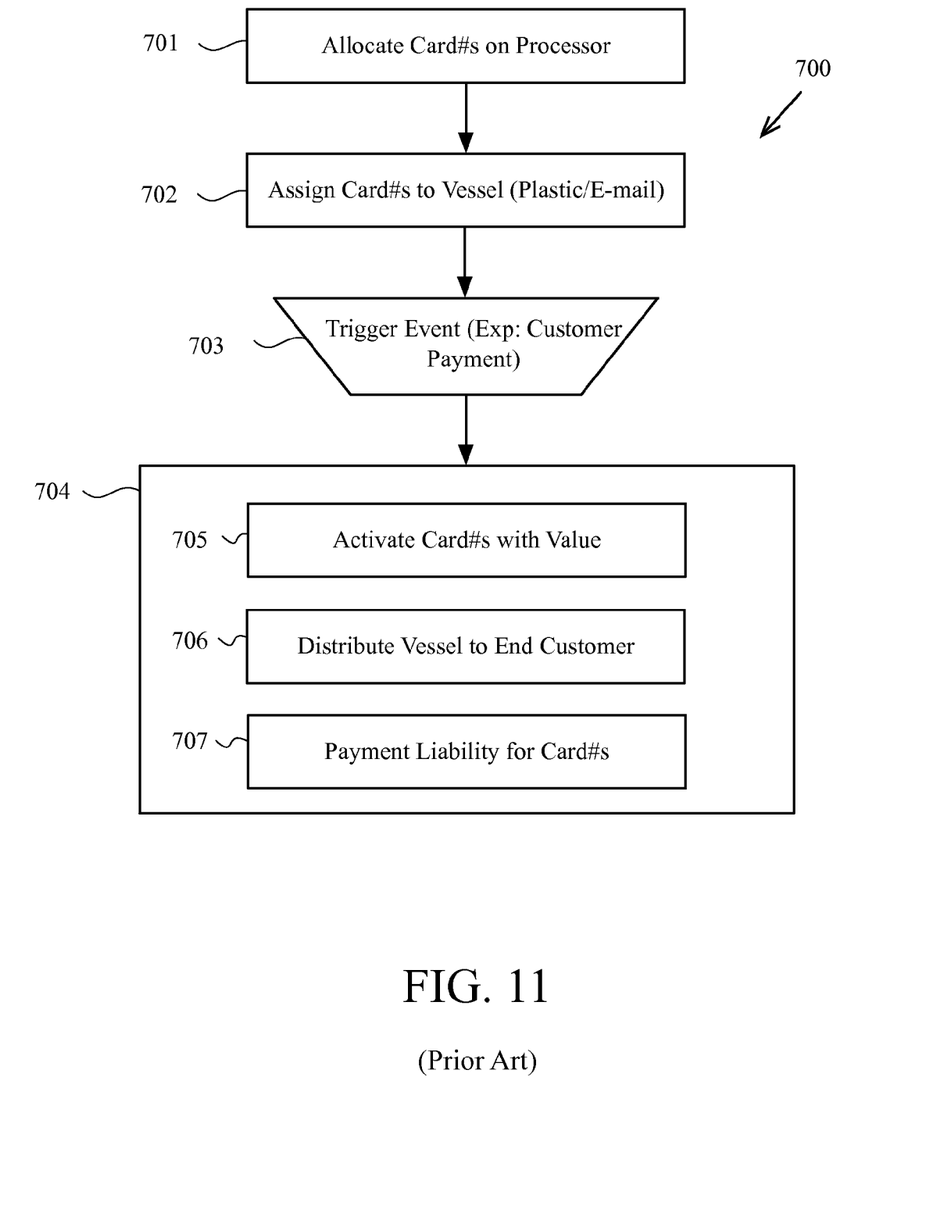
FIG. 11 is a flow chart of a method of the prior art.

Another prior art post-activation payment process 700 is shown in FIG. 11. The process 700 begins with the inventory allocation stage at block 701, where the retailer/brand entity allocates a BIN range of account numbers to the distributor and, at block 702, a processor assigns the account numbers to the plastic gift cards. Next, a triggering event 703 occurs when a customer pays for the gift cards. Next, at block 704, the following three events happen simultaneously; at block 705, an activation stage, the distributor requests that the gift cards be activated on-demand by the retailer/brand entity or the retailer/brand entity's gift card processor; at block 706, the distributor distributes/sells the gift cards to the end users; and at block 707, a purchase stage, the retailer/brand entity invoices the distributor for the activated cards.

Currently, e-gift cards (also known as Virtual or Digital Cards) follow the aforementioned traditional flows. Card account numbers are allocated, and yet, they may never be used if the cards are not distributed or triggered since the numbers cannot be recycled. This creates excess management of card account numbers. For instance, on a mass distribution of card account numbers, all of the account numbers must be allocated (and sometimes assigned to emails), but only a small percentage of the cards may be viewed or redeemed and some cards are never activated.

Stone et al., U.S. Patent Application Number 2010/02380921, discloses a system and method for implementing and managing virtual gift cards.

Chakiris et al., U.S. Pat. No. 7,537,152 discloses a system and method for managing the transfer of value to a third party using short messaging services (SMS) communications.

Graves et al., U.S. Pat. No. 7,083,084 discloses a computerized system and method for managing stored-value card data over a communication network between a plurality of terminals and a central processor.

Yuasa, U.S. Patent Application Number 2002/0198777 discloses a system for issuing, receiving, authenticating and using an e-coupon using a hand-held consumer terminal, such as a cellular phone.

Hurst, U.S. Patent Application Number 2009/0179074 discloses a system and method for distributing mobile gift cards.

Kumar, U.S. Patent Application Number 2010/0041368 discloses methods, systems and computer readable media for electronically delivering a prepaid card to a mobile device.

Nelsen, U.S. Patent Application Number 2010/0076833 discloses a virtual card engine stored on memory that is executable via at least one processor for managing two or more virtual cards.

However, the prior art references have failed to recognize the problems associated with the current stored value account processes let alone provide solutions to the problems of the current stored value account processes, especially for e-gift cards.

BRIEF SUMMARY OF THE INVENTION

The present invention provides a solution to the issues of excess inventory and wasted resources in the gift card industry. The present invention is a novel process where card account numbers are only assigned to stored value accounts (specifically e-gift cards) when viewed or accessed by the end customer, and thus the present invention limits the requirement of assigning account numbers excessively in bulk and eliminates the waste of unused account numbers and/or unused plastic.

The novel method of the present invention allows retailer/brand entities to keep their inventory of card account numbers within their control until requested by an end customer. This helps with the management and accounting of account numbers by more accurately determining how many account numbers for stored value accounts may be redeemed overall.

One aspect of the present invention is a process to activate gift card account numbers. During an inventory allocation stage, a retailer/brand entity allocates a BIN range of account numbers to a distributor. As used in the present application, BIN has a broader definition than just the first six digits (the Issuer Identification Number) on the front of a typical bank card. Un-activated (allocated) card account numbers are uploaded to a system of the present invention. During a distribution stage, using the system of the present invention, a distributor distributes cards without account numbers to end customers via a vessel messaging system (email, text message, Browser or Binary Application). The activation stage starts when the end customer views the e-gift card, which triggers a request for the card to be activated. The system of the present invention activates an account number from the retailer/brand entity (or the retailer/brand entity's card processor). Then, the retailer/brand entity activates the account number. The system of the present invention then assigns the card account number to the end customer. The end customer can then view the e-gift card's account number. Further, the account number is now assigned and the redemption method is now available. For example, the account number may not be displayed but an encrypted bar code containing the account number is displayed to the end user. Finally, during a purchase stage, the retailer/brand entity invoices the distributor for the activated account numbers.

In another aspect of the present invention, during an inventory allocation stage, a retailer/brand entity allocates a BIN range of account numbers to a distributor. Un-activated (allocated) card account numbers are uploaded to a system of the present invention. During the distribution stage, using the system of the present invention, a distributor distributes cards without account numbers to end customers via a vessel messaging system (email, text message, Browser or Binary Application). The activation stage starts when the end customer views the e-gift card, which triggers a request for the card to be activated. Next, the system of the present invention requests an account number from the retailer/brand entity (or retailer/brand entity's card processor). Next, the retailer/brand entity activates a card account number and returns the card account number to the system of the present invention. Next, the system of the present invention assigns a card account number to the end customer. The end customer can then view the e-gift card's account number. Finally, during a purchase stage, the retailer/brand entity invoices the distributor for the activated account numbers.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
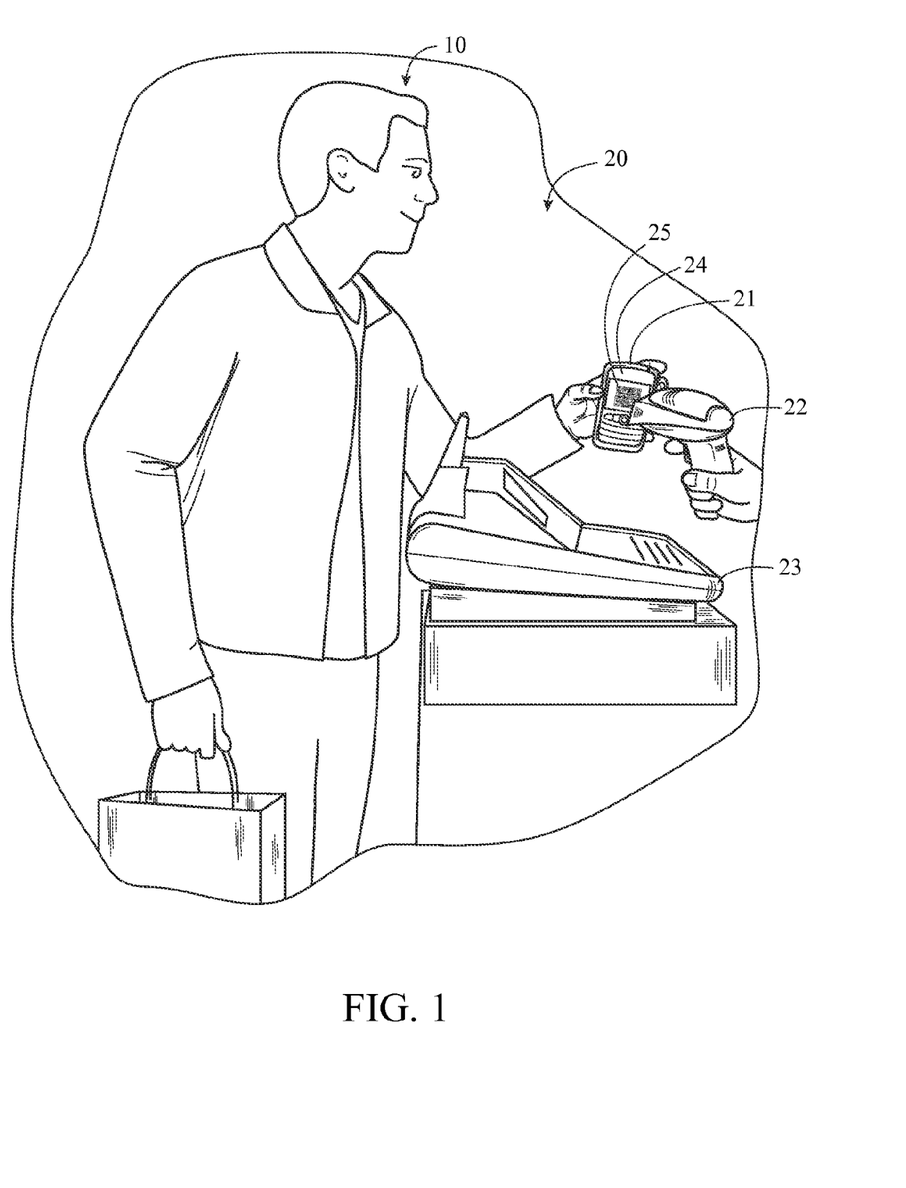
FIG. 1 is an illustration of a point of sale where a consumer is using an electronic gift card.

As shown in FIG. 1, electronic gift cards have become an important part of consumer transactions. At a point of purchase location 10, a consumer 20 uses an electronic gift card ("e-gift card") 25 on his mobile phone 21 to make a purchase. A bar code reader 22 is used to read the e-gift card 25, and the amount of the e-gift card 25 is transmitted by the bar code reader 22 to a cash register 23.

Figures 2, 2A:
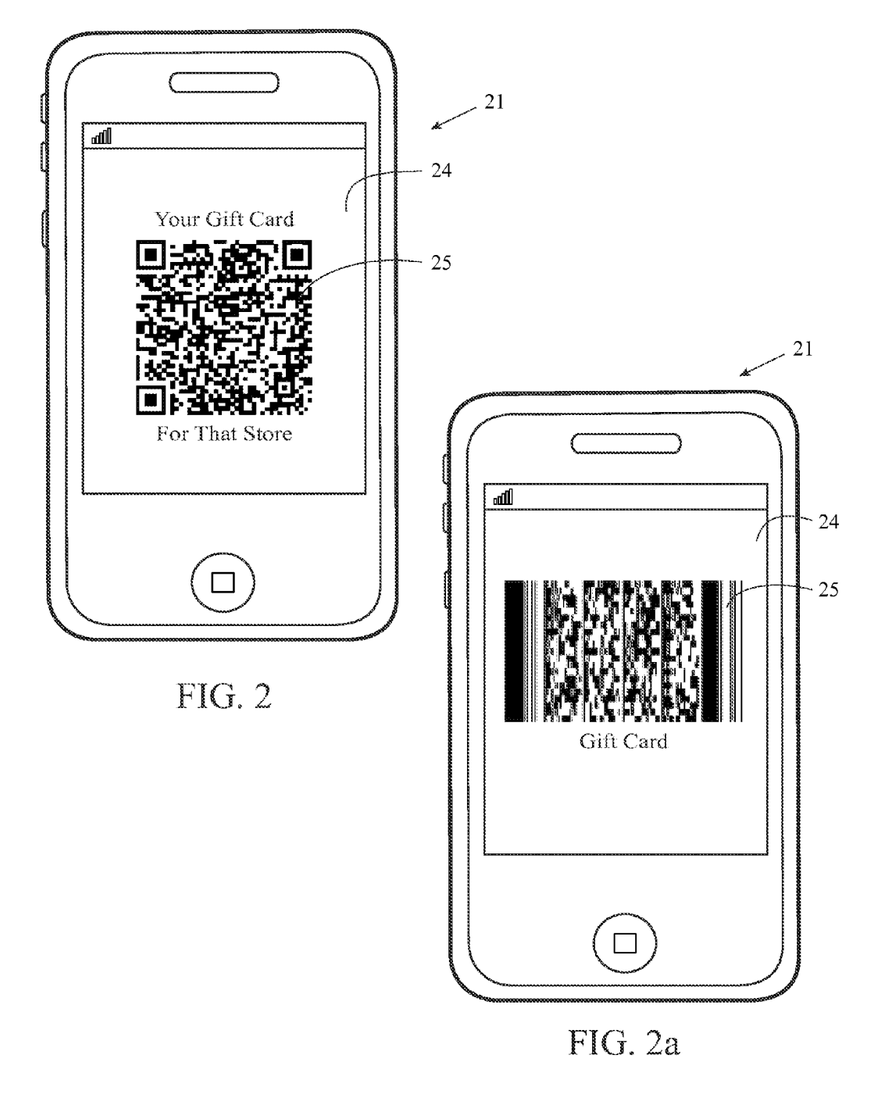
FIG. 2 is an illustration of a mobile phone with an electronic gift card.
FIG. 2a is an illustration of a mobile phone with an electronic gift card displayed on the screen of the mobile phone.

FIGS. 2 and 2a illustrate mobile phones 21 with display screens 24 displaying an e-gift card 25, which includes a bar code. Such preferred mobile phones include the IPHONE® smartphone from Apple, Inc., BLACKBERRY® smartphones from Research In Motion, the ANDROID® smartphone from Google, Inc., the TRE® smartphone from Palm, Inc., and many more. Such mobile phones are preferred interface devices for receiving vessels for the stored value accounts.

Figure 3:
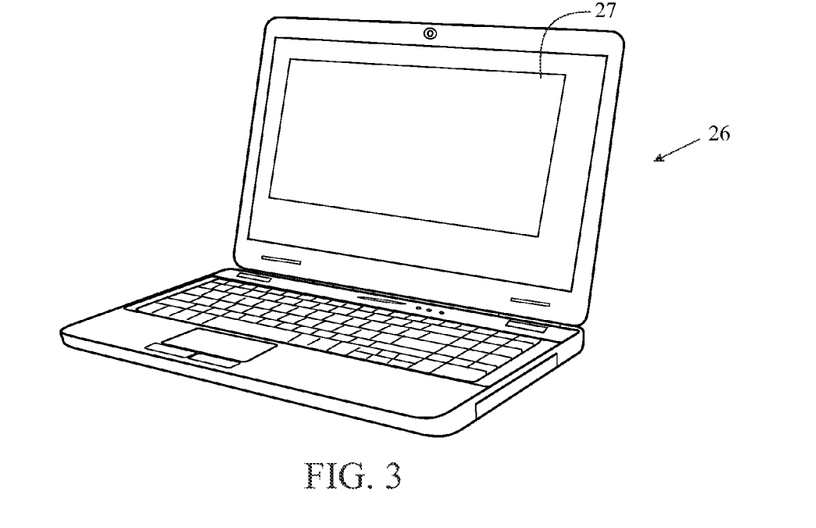
FIG. 3 is a perspective view of a computer.
Figure 3A:
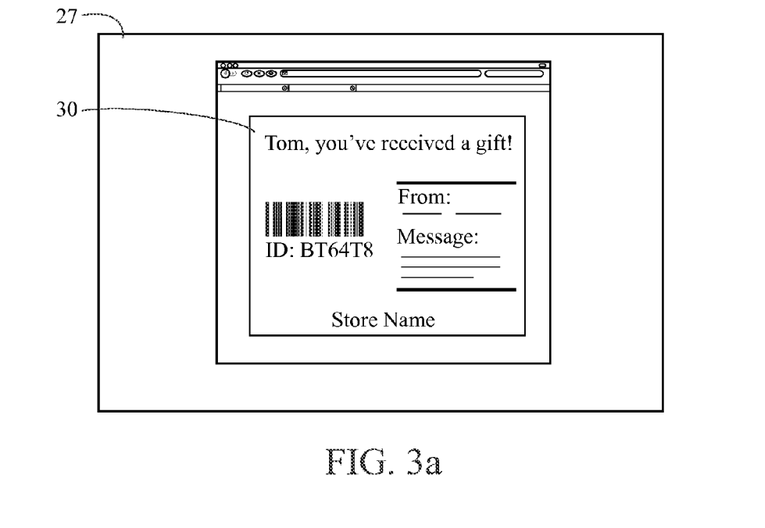
FIG. 3a is an isolated view of a screen of the computer of FIG. 3 illustrating an electronic gift card.

FIG. 3 illustrates an alternative interface device for receiving vessels for the stored value accounts in the form of a laptop computer 26. A display screen 27 of the computer 26 illustrates an e-gift card 30 in the form of an email message sent to an end customer.

In order for e-gift card transactions like the above-mentioned example to occur, complex business-to-business transactions must be executed to prevent fraud, ensure business expectations, and meet the consumer's expectations.

The entities involved in e-gift card transactions vary, but can involve the retailer or merchant of the product or service, a consumer of the product or service, a distributor or wholesaler of e-gift cards, a payment gateway, a merchant account provider, and transaction facilitators.

The following definitions define terms used throughout the specification and claims.

Account Number—(also referenced as Card Account Number)

Payment card number that identifies the issuer and the cardholder.

Activate—to make active; cause to be an authorized payment vehicle.

Allocate—to set apart for a particular purpose; to earmark.

Assign—to specify/credit an account number to a card.

BIN—account number, including the issuer identification number (IIN, formerly BIN), and the individual account number.

Distribute—to pass out or deliver to intended recipients.

Distributor—wholesaler/bulk buyer who buys & sells account numbers in the form of gift cards.

End Customer—Cardholder to whom a card is issued or given.

Inventory—a formal or complete listing of account numbers, as a merchant's stock of goods.

Retailer/Brand—account number owner, and ultimate supplier of goods or services.

Figure 4:
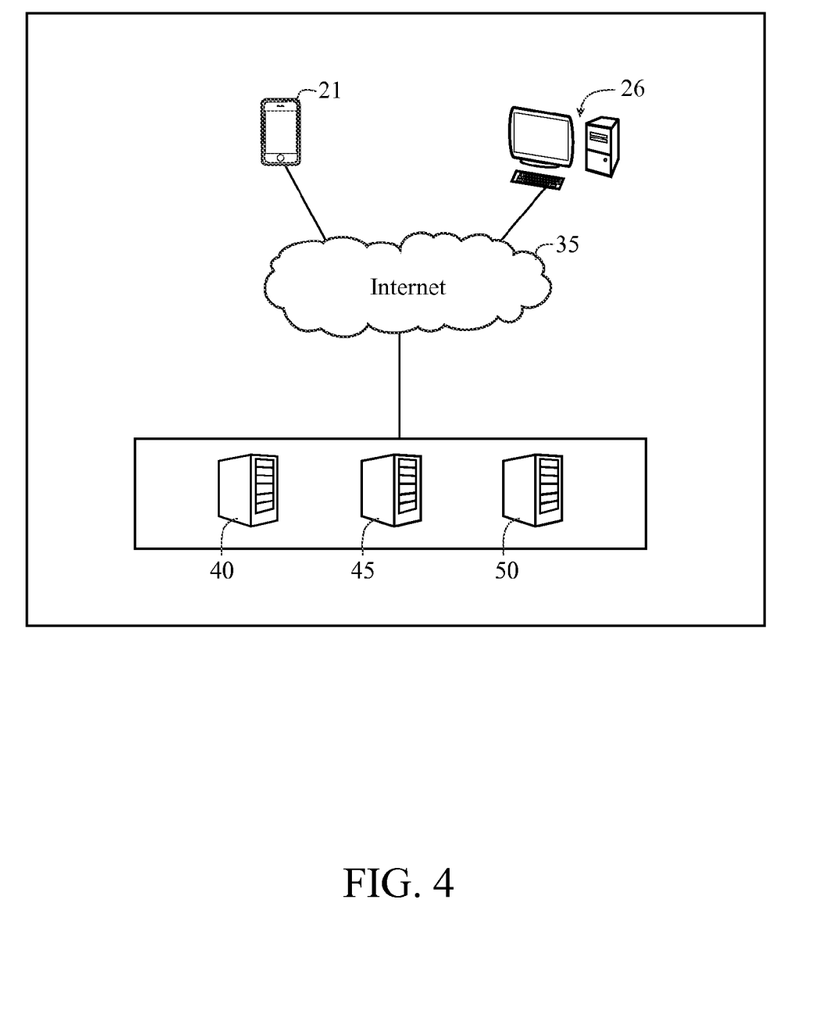
FIG. 4 is a block diagram of a system for just-in-time gift card activation and assignment.

FIG. 4 illustrates a system for post-delivery assignment and activation of an e-gift card. FIG. 4 illustrates a transaction database system 40 (which preferably includes a transaction server and transaction database operated by a transaction facilitator), a distributor server 45, a retailer server 50, and interface devices 21 and 26 of the vessel messaging subsystem. The transaction database system 40, the distributor server 45 and the retailer server 50 all preferably communicate with each other. The vessel messaging sub-system comprises an email, a text message, a browser application or a binary application. The interface devices comprise a mobile phone 21, a personal computer 26, a tablet or a television. The interface devices receive the vessel for the stored value account. Underlying protocol at the server 45 is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP") or other similar protocols. The transmission protocol ranges from SIP to MGCP to FTP and beyond. However, those skilled in the pertinent art will recognize that other protocol may be used without departing from the scope and spirit of the present invention.

Figure 5:
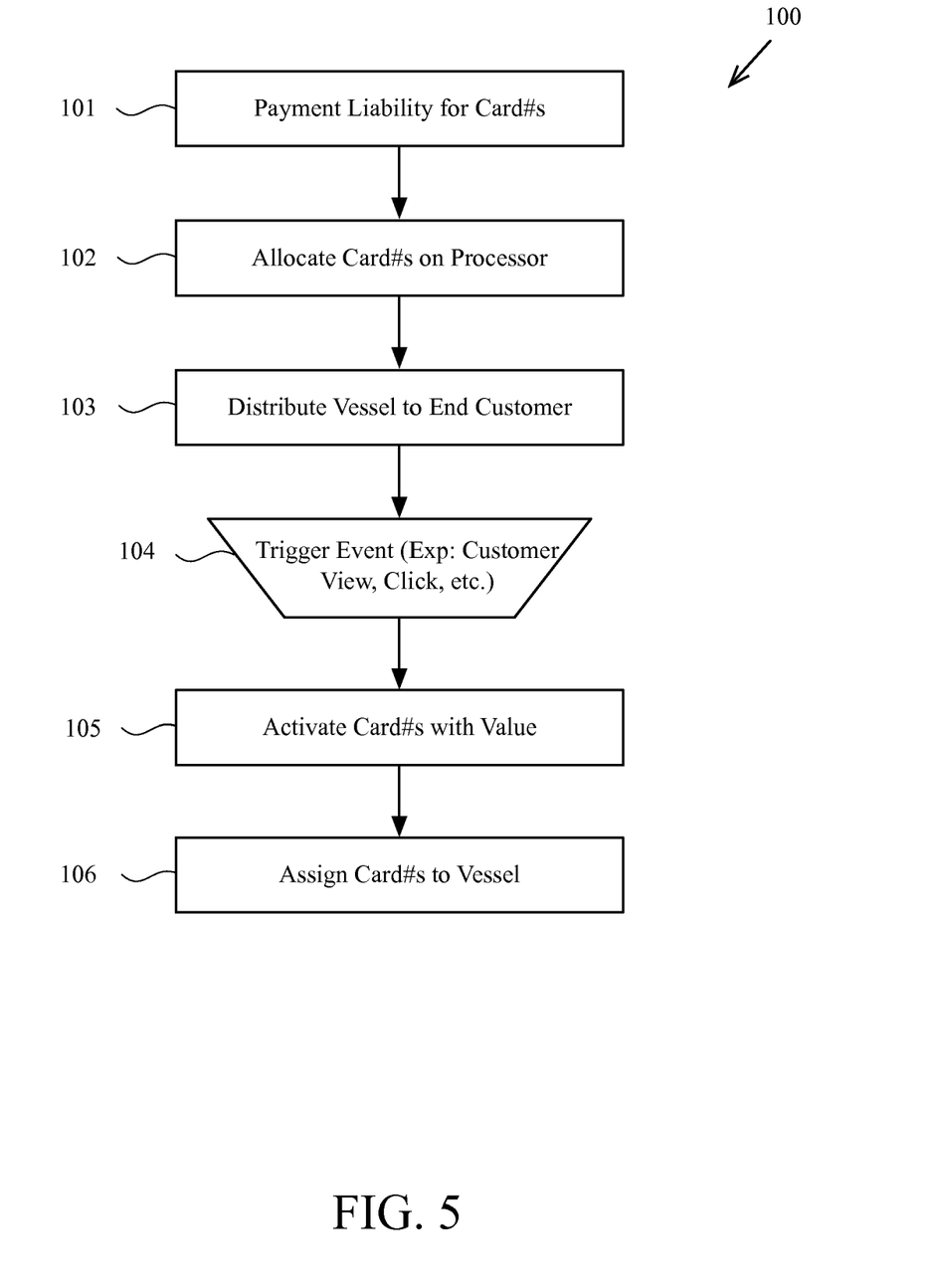
FIG. 5 is a flow chart of a general method for post-delivery assignment and activation of an electronic gift card.

As shown in FIG. 5, a preferred pre-payment activation method 100 of the present invention begins at block 101 with payment liability for the e-gift card distributor, which is the entity that distributes the vessels for e-gifts card to the end customers. At block 102, account numbers are allocated to the distributor by the retailer processor and saved into the transaction database system. At block 103, a vessel for an e-gift card is distributed to an end customer. At block 104, a triggering event occurs after the end customer receives the e-gift card, when the end customer views the e-gift card on a mobile phone or computer. This trigger results in activation of the e-gift card account numbers with a value by the retailer server, at block 105. Finally, at block 106, e-gift card numbers are assigned to the vessel (via the unique identifier of the message, or via cookie use, or other methods) transmitted to the end customer by the transaction database system. The end customer can now print out or view the usable form of the e-gift card's account number by clicking on the card.

Figure 6:
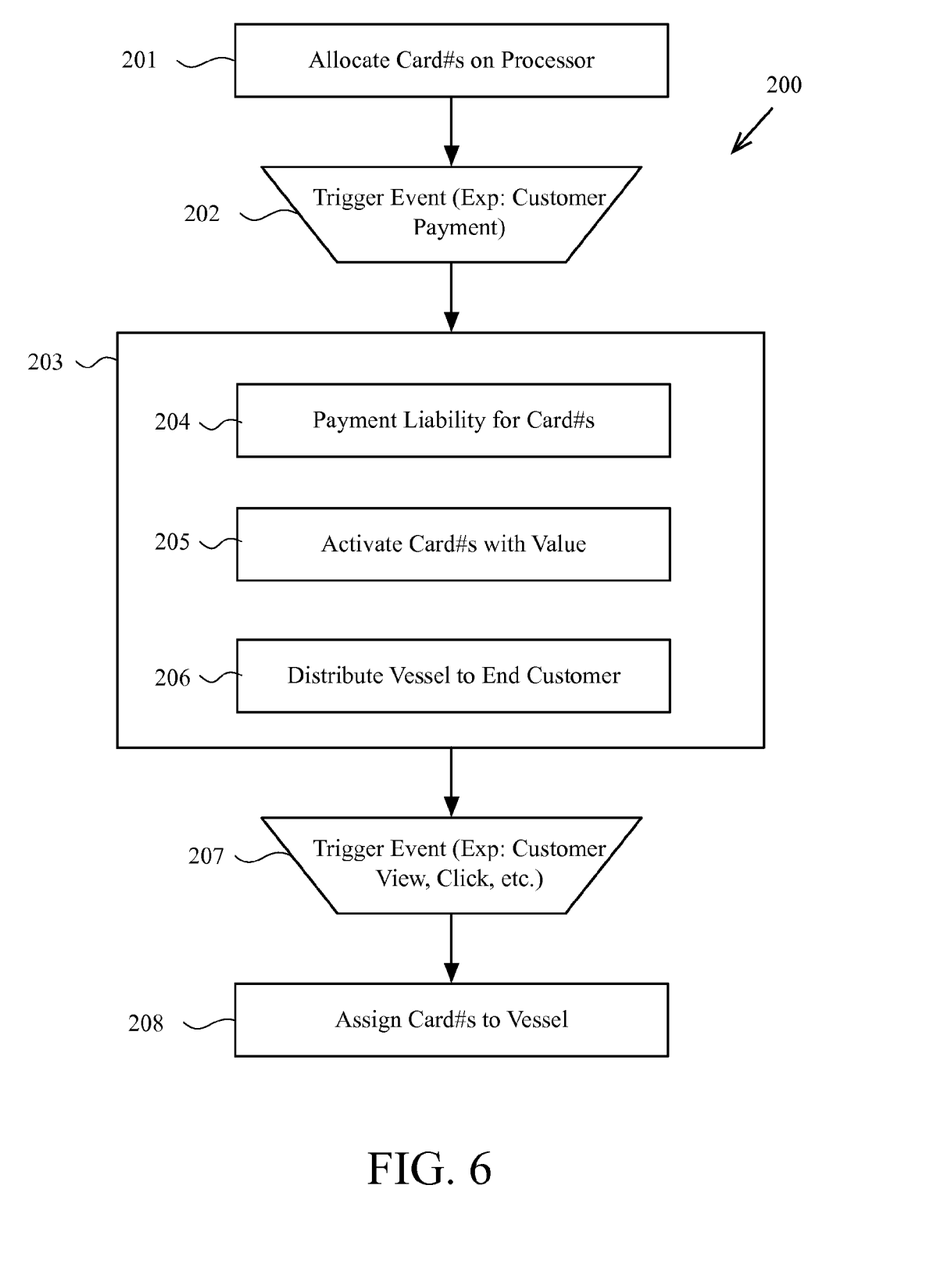
FIG. 6 is a flow chart of a specific method for post-delivery assignment and activation of an electronic gift card.

An alternative method 200 of the present invention is shown in FIG. 6. In this post-activation payment method, account numbers for the e-gift cards are first allocated to the distributor by the retailer processor and saved into the transaction database system at step 201. A triggering event, a customer payment, at block 202, sets off the next multiple events, in general block 203, which occur simultaneously: payment liability for the distributor for the activated card account numbers at block 204; activation of the card account number with a value by the retailer server at block 205; and vessel distribution to the end customer at block 206. Another triggering event at block 207 occurs when the customer views the e-gift card. The card account number is then assigned to the vessel by the transaction database system at block 208. The end customer can now print out or view the usable form of the e-gift card's account number by clicking on the card.

Figure 7:
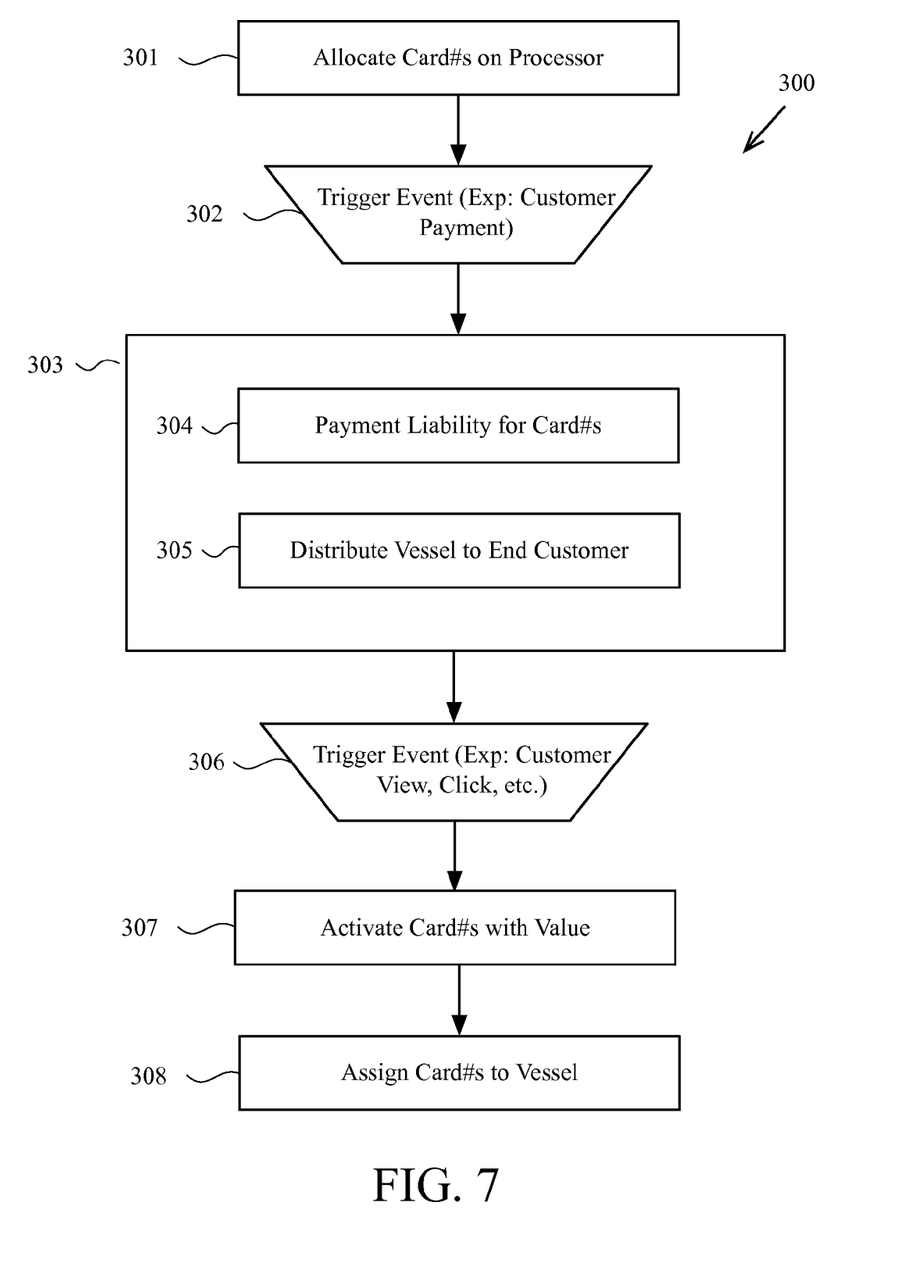
FIG. 7 is a flow chart of a specific method for post-delivery assignment and activation of an electronic gift card.

Another alternative method 300 of the present invention is shown in FIG. 7. In this post-activation payment method, BINs for the e-gift cards are first allocated to the distributor by the retailer processor and saved into the transaction database system at block 301. A triggering event, a customer payment, at block 302, sets off the next multiple events, in general block 303, which occur simultaneously: payment liability for the distributor for the activated card account numbers at block 304; and vessel distribution to the end customer at block 305. Another triggering event occurs at block 306 when the customer views the e-gift card. Next, at block 307, the retailer server activates the card account number with a value. Finally, at block 308, the transaction database system assigns the e-gift card account number to the vessel. The end customer can now print out or view the usable form of the e-gift card's account number by clicking on the card.

Figure 8:
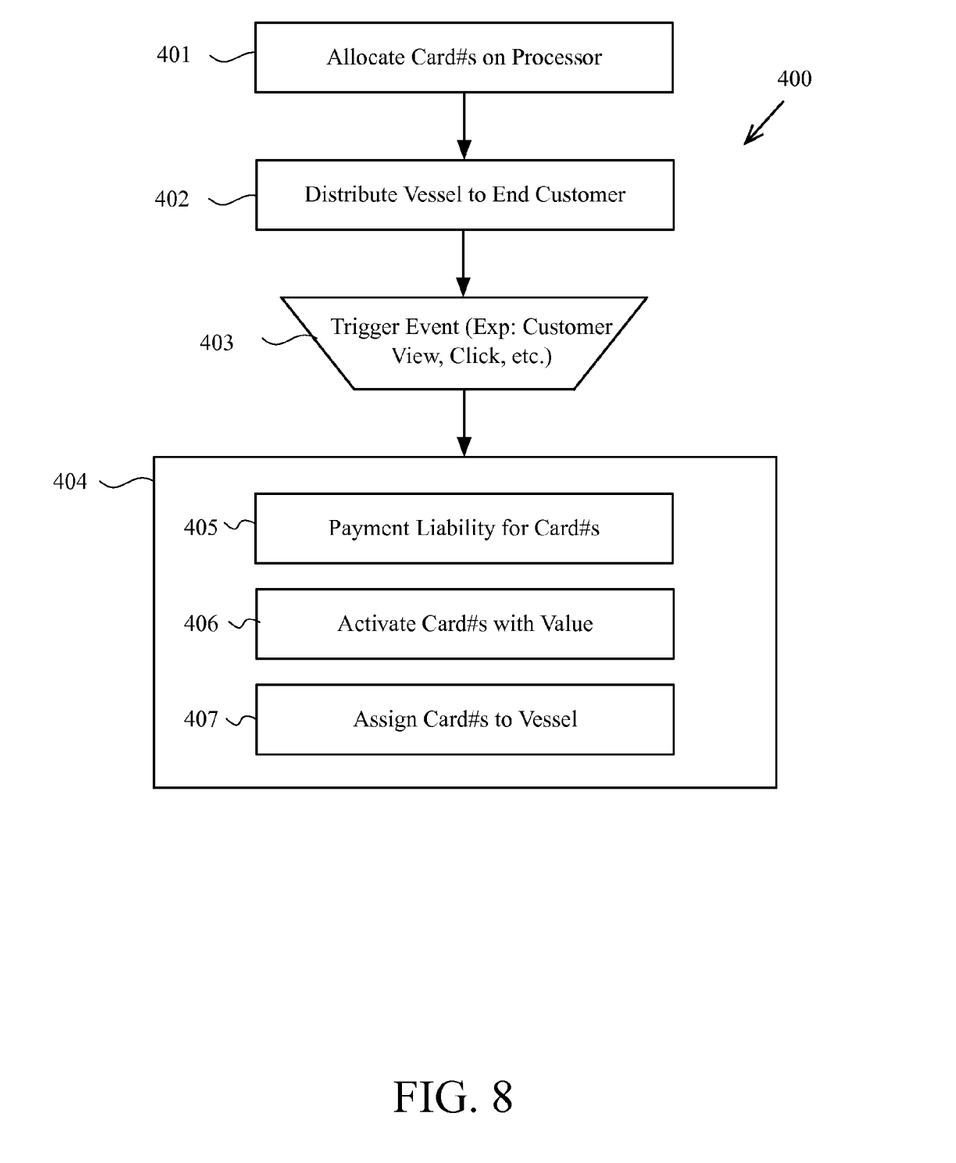
FIG. 8 is a flow chart of a specific method for post-delivery assignment and activation of an electronic gift card.

Yet another alternative method 400 is shown in FIG. 8. In this post-activation payment method, BINs for the e-gift cards are first allocated to the distributor by the retailer processor and saved to the transaction database system at block 401. Next, at block 402, the distribution of the vessel to the end customer occurs. The triggering event occurs at block 403, when the customer views the e-gift card. Next, multiple events occur simultaneously within block 404. These events include the following: payment by the distributor for the e-gift card account numbers at block 405, activation of the e-gift card account numbers with a value, by the retailer server, at block 406, and e-gift card numbers assigned to the vessel by the transaction database system, at block 407. The end customer can now print out or view the usable form of the e-gift card's account number by clicking on the card.

In the prior art technology, as discussed above in reference to FIGS. 9, 10 and 11, the assignment of e-gift card numbers to the vessel (plastic or email) is executed early in the process resulting in wasted resources. The present invention overcomes these problems.

A more detailed description of gift card services is provided in Abifaker, U.S. Pat. No. 7,711,620 for Gift Card Services For Mobile Devices, and in Abifaker, U.S. Patent Publication Number 2008/0059375 for Payment Car Terminal For Mobile Phones, both of which are hereby incorporated by reference in their entireties.

A general method of the present invention is a process to activate gift card account numbers for stored value accounts. During an inventory allocation stage, a retailer/brand entity allocates a BIN range of account numbers to a distributor. Un-activated (allocated) card account numbers are uploaded to a transaction server. During a distribution stage, using the transaction server, a distributor distributes stored value accounts without account numbers to end customers via a vessel messaging system (email, text message, Browser or Binary Application). The activation stage starts when the end customer views the stored value account, which triggers a request for the stored value account to be activated. A transaction server activates an account number from the retailer/brand entity (or the retailer/brand entity's card processor). Then, the retailer/brand entity activates the account number. The transaction server then assigns the account number for the stored value account to the end customer. The end customer can then view the account number (or an image containing or representing the account number such as a bar code) for the stored value account. Further, the account number is now assigned and the redemption method is now available. The account number may not be displayed but an encrypted bar code containing the account number is displayed to the end user. Finally, during a purchase stage, the retailer/brand entity invoices the distributor for the activated account numbers.

In a more general pre-payment activation method of the present invention, the method begins with payment liability for a stored value account distributor, which is the entity that distributes the vessels for stored value accounts to the end customers. Account numbers are allocated to the distributor by the retailer processor and saved into a transaction database system. Then a vessel for a stored value account is distributed to an end customer. Next, a triggering event occurs after the end customer receives the stored value account, when the end customer views the stored value account on a mobile phone or computer. This trigger results in activation of the account numbers for stored value account with a value by the retailer server. Finally, stored value account numbers are assigned to the vessel (via the unique identifier of the message, or via cookie use, or other methods) transmitted to the end customer by the transaction database system. The end customer can now print out or view the usable form of the account number of the stored value account by clicking on the card.

Additionally, another aspect of the present invention, during an inventory allocation stage, a retailer/brand entity allocates a BIN range of account numbers to a distributor. Un-activated (allocated) card account numbers are uploaded to a transaction database system (which is preferably operated by a third party transaction facilitator). During the distribution stage, using the transaction database system, a distributor distributes stored value accounts without account numbers to end customers via a vessel messaging system (email, text message, Browser or Binary Application). The activation stage starts when the end customer views the stored value account, which triggers a request for the stored value account to be activated. Next, the transaction database system requests an account number from the retailer/brand entity (or retailer/brand entity's card processor). Next, the retailer/brand entity activates an account number for the stored value account and returns the account number for the stored value account to the transaction database system. Next, the transaction database system assigns an account number for the stored value account to the end customer. The end customer can then view the account number (or an image representing or containing the account number such as a bar code) for the stored value account. Finally, during a purchase stage, the retailer/brand entity invoices the distributor for the activated account numbers.

In alternative general method of the present invention, BINs for the stored value accounts are first allocated to the distributor by the retailer processor and saved into the transaction database system. A triggering event, a customer payment, sets off the next multiple events, which occur simultaneously: payment liability for the distributor for the account numbers for the activated stored value accounts; and vessel distribution to the end customer. Another triggering event occurs when the customer views the stored value account. Next, the retailer server activates the account number for the stored value account with a value. Finally, the transaction database system assigns the account number for the stored value account to the vessel. The end customer can now print out or view the usable form of the account number for the stored value account by clicking on the image representing the stored value account on the end customer's device.

In yet another alternative general method, BINs for the stored value accounts are first allocated to the distributor by the retailer processor and saved to the transaction database system. Next, the distribution of the vessel to the end customer occurs. The triggering event occurs when the customer views the stored value account. Next, multiple events occur simultaneously. These events include the following: payment by the distributor for the account numbers for the stored value account; activation of the account numbers for the stored value account with a value by the retailer server; and numbers for the stored value accounts assigned to the vessel by the transaction database system. The end customer can now print out or view the usable form of the account number for the stored value account by clicking on the e-gift card or an image representing the e-gift card.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention:

1. A process for post-delivery assignment and activation of an electronic gift card, the process comprising:
    allocating a BIN range of a plurality of account numbers for electronic gift cards from a retailer of the electronic gift cards to a distributor of the electronic gift cards;
    uploading the plurality of account numbers for electronic gift cards to a transaction server;
    distributing a plurality of electronic gift cards for the retailer, each of the plurality of electronic gift cards unassigned an account number, each of the plurality of electronic gift cards for the retailer distributed from the distributor of the electronic gift cards to an end customer through at least one vessel messaging system, the at least one vessel messaging system comprising an email, a text message, a browser application or a binary application;
    receiving an electronic gift card of the plurality of electronic gift cards for the retailer at an end customer through at least one vessel messaging system;
    viewing the electronic gift card of the plurality of electronic gift cards for the retailer at an interface device for the at least one vessel messaging system of the end customer, the interface device for the at least one vessel messaging system comprising a mobile phone, a personal computer, a tablet or a television;
    activating an account number of the plurality of account numbers for electronic gift cards at a retailer server after viewing the electronic gift of the plurality of electronic gift cards for the retailer at an interface device for the at least one vessel messaging system of the end customer;
    assigning at the transaction server the account number of the plurality of account numbers for electronic gift cards to the electronic gift card of the plurality of electronic gift cards for the retailer viewed at the interface device for the at least one vessel messaging system of the end customer, the account number assigned after viewing the electronic gift of the plurality of electronic gift cards for the retailer at an interface device for the at least one vessel messaging system of the end customer;
    permitting viewing of the account number for the electronic gift card of the plurality of electronic gift cards for the retailer by the end customer on the interface device for the at least one vessel messaging system of the end customer; and
    invoicing the distributor for the purchase of the electronic gift card of the plurality of electronic gift cards for the retailer viewed at the interface device for the at least one vessel messaging system of the end customer.

2. The process according to claim 1 further comprising requesting an account number from the retailer server by the transaction server prior to activating an account number of the plurality of account numbers at a retailer server.

3. The process according to claim 1 further comprising activating an account number at the transaction server prior to activating an account number of the plurality of account numbers at a retailer server.

* * * * *